United States Patent
Zhu et al.

(10) Patent No.: US 8,325,842 B2
(45) Date of Patent: Dec. 4, 2012

(54) METHOD AND APPARATUS FOR PRE-PROCESSING DATA TO BE TRANSMITTED IN MULTIPLE-INPUT COMMUNICATION SYSTEM

(75) Inventors: Xiaolong Zhu, Shanghai (CN);
Hongwei Yang, Shanghai (CN); Liyu Cai, Shanghai (CN)

(73) Assignee: Alcatel Lucent, Paris (FR)

( * ) Notice: Subject to any disclaimer, the term of this patent is extended or adjusted under 35 U.S.C. 154(b) by 359 days.

(21) Appl. No.: 12/599,491

(22) PCT Filed: May 10, 2007

(86) PCT No.: PCT/CN2007/001529
§ 371 (c)(1),
(2), (4) Date: Nov. 9, 2009

(87) PCT Pub. No.: WO2008/138165
PCT Pub. Date: Nov. 20, 2008

(65) Prior Publication Data
US 2010/0303170 A1    Dec. 2, 2010

(51) Int. Cl.
*H04B 7/02* (2006.01)
(52) U.S. Cl. ......................... 375/267; 375/299
(58) Field of Classification Search .................. 375/261, 375/267, 299, 295, 148
See application file for complete search history.

(56) References Cited

U.S. PATENT DOCUMENTS

| | | | |
|---|---|---|---|
| 2003/0161282 A1 | 8/2003 | Medvedev et al. | |
| 2004/0042439 A1 | 3/2004 | Menon et al. | |
| 2004/0066761 A1 | 4/2004 | Giannakis et al. | |
| 2005/0078763 A1 | 4/2005 | Choi et al. | |
| 2005/0157776 A1* | 7/2005 | Ryu | 375/148 |
| 2005/0286663 A1 | 12/2005 | Poon | |
| 2006/0098754 A1 | 5/2006 | Kim et al. | |
| 2006/0212237 A1 | 9/2006 | Xin | |
| 2006/0233131 A1 | 10/2006 | Gore et al. | |
| 2007/0049218 A1 | 3/2007 | Gorokhov et al. | |
| 2007/0099578 A1 | 5/2007 | Adeney et al. | |
| 2007/0155336 A1* | 7/2007 | Nam et al. | 455/69 |
| 2008/0170554 A1 | 7/2008 | Wang et al. | |
| 2008/0273618 A1* | 11/2008 | Forenza et al. | 375/261 |
| 2009/0052354 A1 | 2/2009 | Wu et al. | |
| 2009/0117862 A1 | 5/2009 | Le Nir et al. | |
| 2010/0150210 A1 | 6/2010 | Zhao et al. | |

FOREIGN PATENT DOCUMENTS

| | | |
|---|---|---|
| CN | 1689249 A | 10/2005 |
| CN | 1756119 A | 4/2006 |
| CN | 1829119 A | 9/2006 |
| CN | 1832369 A | 9/2006 |

(Continued)

OTHER PUBLICATIONS

International Search Report.

(Continued)

*Primary Examiner* — Emmanuel Bayard
(74) *Attorney, Agent, or Firm* — Fay Sharpe, LLP (57) ABSTRACT

A method for pre-processing data to be transmitted in a multiple-input communication system comprises the following steps: generating a beamforming matrix and a pre-coding matrix; combining the beamforming matrix and the pre-coding matrix to generate a weight matrix; and pre-processing the data by using the generated weight matrix. There are also provided a transmitter, a base station, and a communication system using the method.

38 Claims, 3 Drawing Sheets

FOREIGN PATENT DOCUMENTS

| | | |
|---|---|---|
| CN | 1835416 A | 9/2006 |
| CN | 1838556 A | 9/2006 |
| CN | 1864347 A | 11/2006 |
| CN | 1890908 A | 1/2007 |
| CN | 1941660 A | 4/2007 |
| CN | 1941661 A | 4/2007 |
| CN | 100438370 C | 11/2008 |
| EP | 1777839 A2 | 4/2007 |
| WO | 2005048485 A1 | 5/2005 |
| WO | 2007027825 A2 | 3/2007 |
| WO | 2007051193 A2 | 5/2007 |

OTHER PUBLICATIONS

English Abstract for Chinese Pat. App. Publication No. 1829119, filed Mar. 2, 2005, Printed From Thompson Innovation on Jan. 2, 2012 (3 pages).

3GPP TSG RAN WG1 #47, R1-063467, Feedback Methods for Downlink MIMO Pre-Coding for E-UTRA, RIGA, Latvia, Interdigital Communications Corporation, Nov. 2, 2006 (6 pages).

European Pat. App. No. 07721102.7, Extended European Search Report, Mailed Nov. 14, 2011 (8 pages).

International Pat. App. No. PCT/CN20071001529, International Search Report, Mailed Feb. 14, 2008 (2 pages).

International Pat. App. No. PCT/CN2007/001529, Written Opinion of the International Searching Authority, Mailed Feb. 14, 2008 (4 pages).

English Bibliography for Chinese Pat. App. Publication No. 1941661, filed Sep. 30, 2005, Printed From Thompson Innovation on Apr. 11, 2012.

English Bibliography for Chinese Pat. App. Publication No. 1890908, filed Dec. 2, 2004, Printed From Thompson Innovation on Apr. 11, 2012.

English Bibliography for Chinese Pat. App. Publication No. 1864347, filed Oct. 6, 2004, Printed From Thompson Innovation on Apr. 11, 2012.

English Bibliography for Chinese Pat. App. Publication No. 1838556, filed Mar. 24, 2005, Printed From Thompson Innovation on Apr. 11, 2012.

English Bibliography for Chinese Pat. App. Publication No. 1835416, filed Aug. 22, 2005, Printed From Thompson Innovation on Apr. 11, 2012.

English Bibliography for Chinese Pat. App. Publication No. 1689249, filed Aug. 19, 2003, Printed From Thompson Innovation on Apr. 11, 2012.

English Bibliography for Chinese Pat. App. Publication No. 1653721, filed Feb. 19, 2003, Printed From Thompson Innovation on Apr. 11, 2012.

English Bibliography for Chinese Pat. App. Publication No. 1832369, filed Mar. 12, 2005, Printed From Thompson Innovation on Apr. 11, 2012.

English Bibliography for Chinese Pat. App. Publication No. 1941660, filed Sep. 30, 2005, Printed From Thompson Innovation on Apr. 11, 2012.

English Bibliography for Chinese Pat. App. Publication No. 1756119, filed Sep. 28, 2004, Printed From Thompson Innovation on Apr. 11, 2012.

\* cited by examiner

METHOD AND APPARATUS FOR PRE-PROCESSING DATA TO BE TRANSMITTED IN MULTIPLE-INPUT COMMUNICATION SYSTEM

FIELD OF THE INVENTION

The present invention relates to the field of communication technology and, more particularly, to a method and apparatus for pre-processing data to be transmitted in a multiple-input communication system, and a transmitter, base station, and communication system comprising the apparatus.

BACKGROUND OF THE INVENTION

Single-Input Single-Output Communication System

Figure 1:
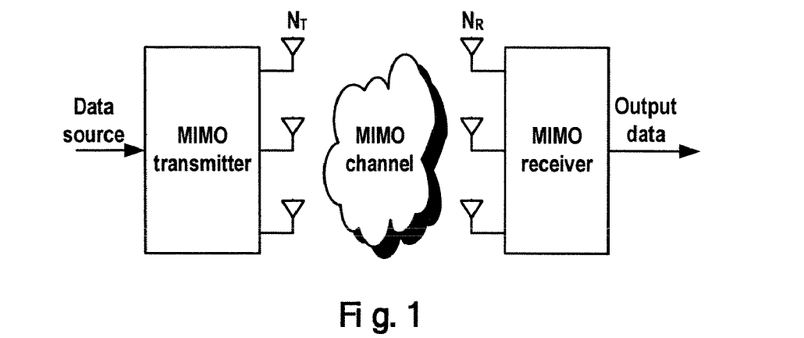
FIG. 1 illustrates a block diagram of a MIMO communication system in the prior art.

A traditional wireless communication system usually employs a single transmit antenna and a single receive antenna, i.e., a so-called single-input single-output (SISO) communication system. In the traditional single-input single-output communication system, radio-frequency (RF) modulated data from a transmitter located at a base station arrive at a receiver at a mobile station along a transmission path. However, characteristics of the transmission path often vary with time due to several factors like fading and multi-channel. Moreover, channel capacity of the traditional single-input single-output communication system is subjected to an insurmountable bottleneck, namely Shannon capacity restriction.
Multiple-Input Multiple-Output Communication System To eliminate the above-discussed drawback in the traditional single-input single-output communication system, multiple-input multiple-output (MIMO) communication systems have been proposed and developed. FIG. 1 illustrates a schematic view of a MIMO communication system in the prior art. As illustrated in FIG. 1, the MIMO communication system usually comprises a transmitter with a number ($N_T$) of transmit antennas, located at a base station, and a receiver with a number ($N_R$) of receive antennas, located at a mobile terminal. MIMO channels formed of the $N_T$ number of transmit antennas and the $N_R$ number of receive antennas can be decomposed into an $N_S$ number of individual sub-channels, in which $N_S \leq \min\{N_T, N_R\}$. Each of the $N_S$ number of individual sub-channels is further termed a control sub-channel of MIMO communication system and corresponds to one-dimensional space. With additional dimensions established by multiple transmit antennas and multiple receive antennas, the MIMO system can provide improved performance, such as increased transmission capacity. Further, in the MIMO communication system, individual data flows can be respectively transmitted on the $N_S$ control sub-channels, so that utilization efficiency of spectrum is increased.

Thus, the MIMO communication system, when compared with the traditional SISO communication system, can increase capacity of the communication system and utilization efficiency of spectrum by times without adding bandwidth. MIMO technique has become one of key techniques that will be used by the new and next-generation mobile communication systems. At present, several standards, such as WLAN (IEEE802.11n), WiMAX (IEEE802.16d and IEEE802.16e), IEEE802.20, IEEE802.22, 3GPP Release 7, and 3GPP Release 8 (LTE), have specified support for MIMO.

Due to the size, power, and cost limitations, in the MIMO communication system, the mobile terminal is configured with fewer antennas and RF channels than the base station, e.g., two transmit or receive antennas at the mobile terminal while four transmit or receive antennas at the base station. To make full use of the antennas at the base station, a variety of enhancement techniques are presented for the MIMO communication system. The existing enhancement techniques can be classified into two major categories: open-loop ones and closed-loop ones.

In the open-loop MIMO enhancement technique, the transmitter does not utilize MIMO channel information but directly transmits input data from itself to the receiver over MIMO channels. Typically, the open-loop enhancement technique comprises space-time coding (STC) technique and cyclic delay diversity (CDD) technique.

Figure 2:
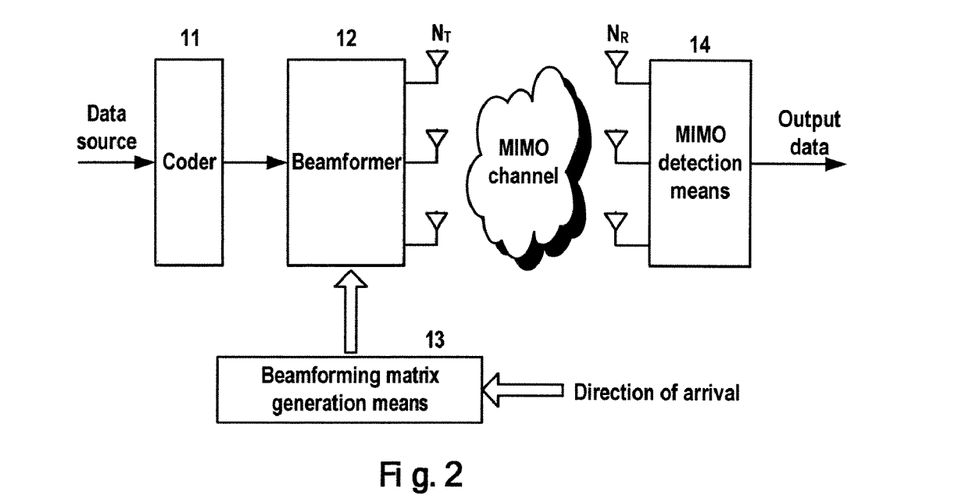
FIG. 2 illustrates a block diagram of a MIMO communication system in the prior art comprising a beamformer.

In the closed-loop MIMO enhancement technique, on the contrary, the transmitter has a prior knowledge of all or part of channel information and exploits the information to improve system performance. Specifically, the transmitter pre-processes input data by using channel information or user location information and transmits the pre-processed data to the receiver through a plurality of transmit antenna diversities. The receiver receives the transmitted data over receive antennas, processes and outputs the received data. Hence, the closed-loop MIMO enhancement technique outperforms the open-loop MIMO enhancement technique. Typically, the closed-loop MIMO enhancement technique comprises beamforming MIMO technique and pre-coding MIMO technique.
Combination of MIMO Communication System and Beamforming Technique The beamforming MIMO technique generates beams with specific spatial orientation by using antennas, so as to enhance antenna gain and interference suppression gain. Usually, the beamforming MIMO technique is based on different locations of a target user and interference users and steers the main beam to the target user while aiming the side lobe or nulling beam at the interference users. In this manner, the beamforming technique can effectively reduce negative impact exerted by interference. FIG. 2 illustrates a block diagram of a MIMO communication system in the prior art comprising a beamformer. As illustrated in FIG. 2, a coder 11 performs channel coding, constellation modulation, and MIMO coding on input data in order to form one or multiple-channel coded data. Next, the coded data are input to a beamformer 12. At the same time, beamforming matrix generation means 13 generates a beamforming matrix for each transmit antenna and each channel of coded data according to information like direction of arrival (DOA) and provides the generated beamforming matrix to the beamformer 12. The beamformer 12 weights and sums the coded data by using the beamforming matrix, i.e., first weights each channel of coded data by a beamforming vector, and then sums the obtained weighted results of all channels of coded data for each transmit antenna as transmitted data corresponding to this transmit antenna. The coded data which have been weighted and summed are transmitted over transmit antennas. At the receiver, receive antennas receive the transmitted data. MIMO detection means 14 processes and outputs the received data. methods for generating beamforming weighted vectors and beamforming techniques have been disclosed in Chinese Patent Applications CN1653721, CN1689249, CN1864347, and CN1835416, which are hereby incorporated as reference.

The beamforming technique can provide interference suppression gain and is preferred in strong interference environments. However, in the case of weak interference, e.g., in a communication system with high frequency reuse factor, such beamforming technique benefits quite little.

Combination of MIMO Communication System and Pre-Coding Technique

Figure 3:
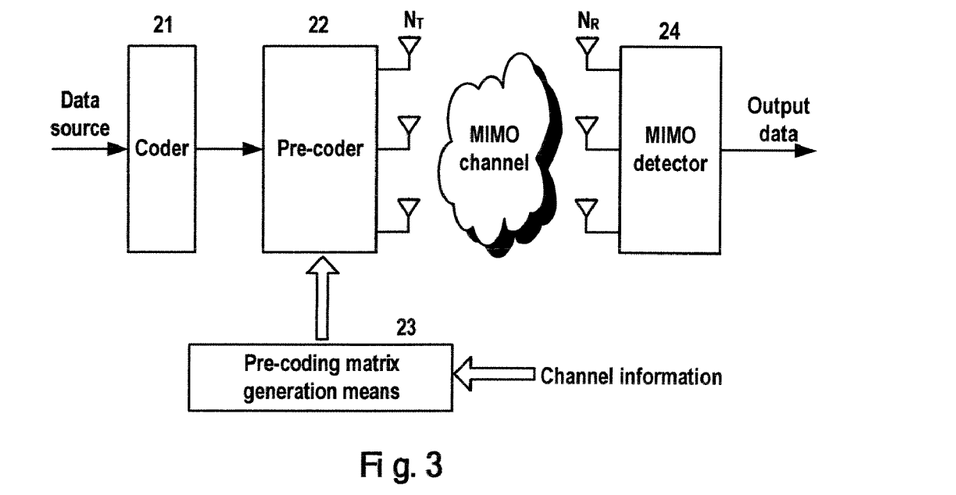
FIG. 3 illustrates a block diagram of a MIMO communication system in the prior art comprising a pre-coder.

In the pre-coding MIMO technique, the transmitter can configure MIMO transmission parameters in advance according to instantaneous or long-term MIMO channel information and through matrix coding, so that data are respectively transmitted over individual sub-channels, and diversity gain is achieved. Usually, the transmitter obtain MIMO channel information according to symmetry of uplink and downlink channels of the communication system or feedback channels. FIG. 3 illustrates a block diagram of a MIMO communication system in the prior art comprising a pre-coder. As illustrated in FIG. 3, a coder 21 performs channel coding, constellation modulation, and MIMO coding on input data in order to form one or multiple-channel coded data. Next, the coded data are input to a pre-coder 22. At the same time, pre-coding matrix generation means 23 generates a pre-coding matrix according to estimated channel matrix information for example and provides the generated pre-coding matrix to the pre-coder 22. The pre-coder 22 pre-codes the coded data by using the generated pre-coding matrix, i.e., first weights each channel of coded data by a pre-coding vector, and then sums the obtained weighted results of all channels of coded data for each transmit antenna as transmitted data corresponding to this transmit antenna. The pre-coded data are transmitted over individual sub-channels over transmit antennas. At the receiver, receive antennas receive the transmitted data. MIMO detection means 24 processes and outputs the received data. Methods for generating a pre-coding matrix according to matrix information have been disclosed in Chinese Patent Applications CN1756119A, CN1890908, CN1832369, CN 1838556, CN1941660, and CN1941661, which are hereby incorporated as reference.

It is seen pre-coding MIMO technique can reduce negative impact of channel fading or spatial correlation of channels on the MIMO communication system, thereby providing diversity gain. However, the pre-coding MIMO technique has no interference suppression gain capability, so it is rather deficient in strong interference environments, such as a MIMO communication system with a frequency reuse factor of 1.

In summary, although the existing beamforming MIMO technique has fine interference suppression capability, it cannot provide sufficient diversity gain. On the other hand, although the existing pre-coding MIMO technique provides fine diversity gain to eliminate negative impact of channel fading or spatial correlation, it cannot effectively combat interference. Therefore, neither the beamforming MIMO technique nor the pre-coding MIMO technique can achieve the best overall performance in application environments where the interference level may diverge greatly.

SUMMARY OF THE INVENTION

An object of the present invention is to provide a method and device for pre-processing data to be transmitted in a multiple-input communication system, which can provide the best overall performance to the communication system even in application environments where the interference level may diverge greatly.

To achieve this object, the present invention provides, by combining the existing beamforming MIMO technique and the existing pre-coding MIMO technique, a flexible solution for configuring a pre-processing weight matrix at the front end of MIMO such that the communication system can achieve the best overall performance.

According to an aspect of the present invention, there is provided a method for pre-processing data to be transmitted in a multiple-input communication system. The method comprises: generating a beamforming matrix and a pre-coding matrix; combining the beamforming matrix and the pre-coding matrix to generate a weight matrix; and pre-processing the data by using the generated weight matrix.

According to an embodiment of the present invention, a linear combination is performed on the beamforming matrix and the pre-coding matrix according to the following formula, in order to generate the weight matrix:

$$W = a \times B + b \times P$$

in which B is a beamforming matrix, P is a pre-coding matrix, W is a weight matrix, and a and b are constants, wherein the values of a and b are selected according to a measured interference level.

According to an embodiment of the present invention, beamforming weighted vectors are generated according to estimated location information of a target user and/or interference users, and the beamforming weighted vectors are arranged in order to generate a beamforming matrix.

Preferably, if the dimension of the beamforming weighted vector is equal to the number of transmit antennas, the plurality of beamforming weighted vectors is arranged in a column order to generate the beamforming matrix. If the dimension of the beamforming weighted vector is less than the number of transmit antennas, zero is filled at a specific location of the beamforming weighted vector to generate weighted vectors with the dimension equal to the number of transmit antennas, and the weighted vectors are arranged in a column order to generate the beamforming matrix.

According to an embodiment of the present invention, the location information is the direction of arrival.

According to an embodiment of the present invention, a pre-coding matrix is generated according to channel information.

According to an embodiment of the present invention, a pre-coding matrix is generated according to long-term channel information. Preferably, the long-term channel information may be the covariance matrix or mean matrix of channels.

According to an embodiment of the present invention, a pre-coding matrix is generated according to an instantaneous channel matrix.

According to an embodiment of the present invention, a pre-coding matrix is generated according to long-term channel information and an instantaneous channel matrix.

According to an embodiment of the present invention, if channel information is not available, then a pre-coding matrix is selected as an identity matrix or a certain sub-matrix formed by part of column vectors of an identity matrix.

According to an embodiment of the present invention, if the interference level is very high, a is selected to be close or equal to 1, and b is selected to be close or equal to 0.

According to an embodiment of the present invention, if the interference level is very low, a is selected to be close or equal to 0, and b is selected to be close or equal to 1.

According to an embodiment of the present invention, if the interference level is medium, values of a and b are selected such that $0 < a < 1$ and $0 < b < 1$.

According to an embodiment of the present invention, Generally, if more beamforming gain is required than pre-coding gain, values of a and b are selected such that $a > b$.

According to an embodiment of the present invention, if more pre-coding gain is required than beamforming gain, values of a and b are selected such that $a < b$.

According to an embodiment of the present invention, the multiple-input communication system is a multiple-input single-output communication system.

According to an embodiment of the present invention, the multiple-input communication system is a multiple-input multiple-output communication system.

According to another aspect of the present invention, there is provided a device for pre-processing data to be transmitted in a multiple-input communication system. The device comprises: beamforming matrix generation means for generating a beamforming matrix; pre-coding matrix generation means for generating a pre-coding matrix; combination means for combining the beamforming matrix and the pre-coding matrix to generate a weight matrix; and pre-processing means for pre-processing the data by using the generated weight matrix.

According to an embodiment of the present invention, the combination means performs a linear combination on the beamforming matrix and the pre-coding matrix according to the following formula, in order to generate the weight matrix:

$$W = a \times B + b \times P$$

in which B is a beamforming matrix, P is a pre-coding matrix, W is a weight matrix, and a and b are constants, wherein the values of a and b are selected according to a measured interference level.

According to an embodiment of the present invention, the beamforming matrix generation means generates beamforming weighted vectors according to estimated location information of a target user and/or interference users, and arranges the plurality of beamforming weighted vectors in order to generate a beamforming matrix.

Preferably, if the dimension of the beamforming weighted vector is equal to the number of transmit antennas, the plurality of beamforming weighted vectors is arranged in a column order to generate the beamforming matrix. If the dimension of the beamforming weighted vector is less than the number of transmit antennas, zero is filled at a specific location of the beamforming weighted vector to generate weighted vectors with the dimension equal to the number of transmit antennas, and the weighted vectors are arranged in a column order to generate the beamforming matrix.

According to an embodiment of the present invention, the location information is the direction of arrival.

According to an embodiment of the present invention, the pre-coding matrix generation means generates a pre-coding matrix according to channel information.

According to an embodiment of the present invention, the pre-coding matrix generation means generates a pre-coding matrix according to long-term channel information, wherein the long-term channel information may be the covariance matrix or mean matrix of channels.

According to an embodiment of the present invention, the pre-coding matrix generation means generates a pre-coding matrix according to an instantaneous channel matrix.

According to an embodiment of the present invention, the pre-coding matrix generation means generates a pre-coding matrix according to long-term channel information and an instantaneous channel matrix.

According to a further aspect of the present invention, there is provided a transmitter, which comprises the above-described device for pre-processing data to be transmitted in a multiple-input communication system.

According to a further aspect of the present invention, there is provided a base station, which comprises the above-described transmitter.

According to a further aspect of the present invention, there is provided a communication system, which comprises the above-described base station.

Compared with the prior art, the inventive solution integrates the beamforming MIMO technique and the pre-coding MIMO technique. In this way, the inventive solution combines the advantages of both beamforming and pre-coding MIMO techniques and thus can be used in wider applications.

BRIEF DESCRIPTION ON THE DRAWINGS

Description is given below to the preferred embodiments of the present invention with reference to the accompanying drawings wherein.

DESCRIPTION OF THE PREFERRED EMBODIMENTS

For the purposes of clear description, some aspects and embodiments of the present invention are specified to MIMO communication systems only. However, the present invention is not limited to MIMO communication systems but can be applied to any type of multiple-input communication systems. The multiple-input communication system is a communication system having a number ($N_T$) of transmit antennas and one or more ($N_R$) receive antennas. The multiple-input communication system comprises, for example, a multiple-input single-output (MISO) communication system, a multiple-input multiple-output (MIMO) communication system, a MIMO communication system utilizing orthogonal frequency-division multiplexing (OFDM), a MIMO communication system utilizing space division multiple access (SDMA), etc.

The basic principle of the present invention is to use a combination of a beamforming matrix and a pre-coding matrix for integrating the beamforming MIMO technique and the pre-coding MIMO technique and to determine a form of the combination by dynamically estimating the interference level at the base station. Although beamforming and pre-coding follow different principles, both of them process transmitted signals by using specific transformations, i.e., a beamforming matrix or a pre-coding matrix. Therefore, beamforming and pre-coding can be unified from the perspective of signal processing.

Description is given below to the embodiments of the present invention with reference to the accompanying drawings.

Figure 4:
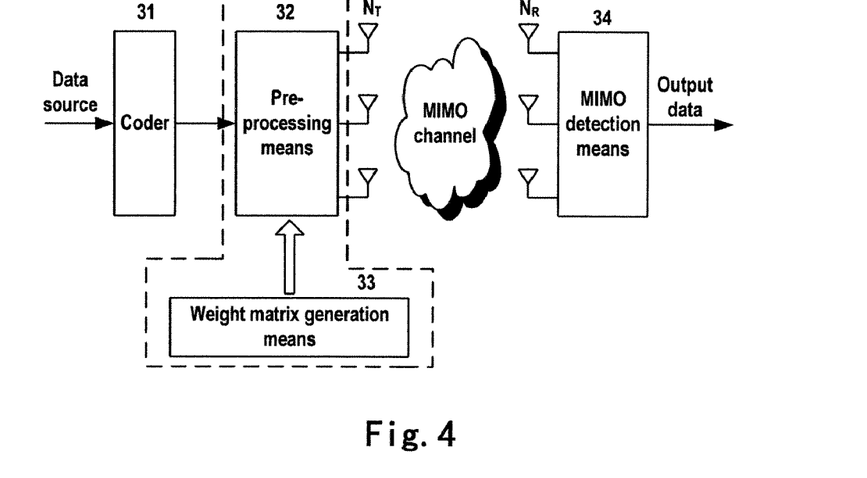
FIG. 4 illustrates a schematic view of a MIMO communication system according to the present invention.

FIG. 4 illustrates a block diagram of a MIMO communication system according to the present invention. As illustrated in FIG. 4, the MIMO communication system according to the present invention comprises a coder 31, pre-processing means 32, weight matrix generation means 33, and a plurality of transmit antennas $N_T$ on the transmitter side. The MIMO communication system according to the present invention further comprises a plurality of receive antennas $N_R$ and MIMO detection means 34 on the receiver side. The block surrounded by dashed lines in FIG. 4 depicts a device for pre-processing data to be transmitted in a multiple-input communication system according to the present invention.

Specifically, on the transmitter side, the coder 31 performs channel coding, constellation modulation, and MIMO coding over input data in order to provide one or more channels of coded data. The pre-processing means 32 receives the coded data and a weight matrix for pre-processing from the weight matrix generation means 33 and pre-processes the received coded data by using the weight matrix. The pre-processed coded data are transmitted over the $N_T$ number of transmit antennas. On the receiver side, data transmitted over MIMO channels are received over the NR number of receive antennas. The MIMO detection means 34 processes and outputs the received data. As the operations of the coder 31, the pre-processing means 32, and the MIMO detection means 34 are well known in the art, details thereof are omitted hereby.

Figure 5:
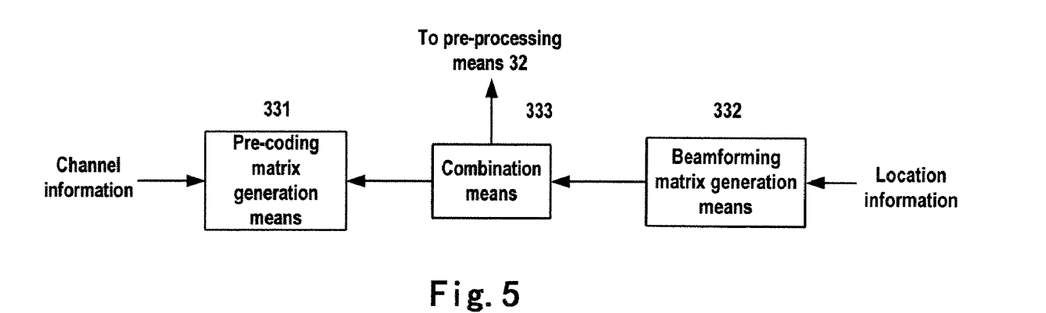
FIG. 5 illustrates a block diagram of details of weight matrix generation means in FIG. 4.

FIG. 5 illustrates a detailed block diagram of the weight matrix generation means 33 in FIG. 4. As illustrated in FIG. 5, the weight matrix generation means according to the present invention comprises pre-coding matrix generation means 331, beamforming matrix generation means 332, and combination means 333.

Specifically, the pre-coding matrix generation means 331 generates a pre-coding matrix according to obtained channel information, wherein the channel information can be obtained by means of symmetry of uplink and downlink channels of a communication system or feedback channels. In the present invention, the pre-coding matrix generation means 331 can generate a pre-coding matrix by using various pre-coding matrix generating method that are available at present or in future. For example, methods for generating a pre-coding matrix as disclosed in Chinese Patent Applications CN1756119A, CN1890908, CN1832369, CN 1838556, CN1941660, and CN1941661 can be used in the present invention. The disclosure of these patent applications is incorporated in its entirety as part of the present specification.

The beamforming matrix generation means 332 generates a beamforming matrix according to obtained location information (e.g., direction of arrival) of a target user and/or interference users. In the present invention, beamforming weighted vectors can be obtained by using various beamforming weighted vector generating methods that are available at present or in future. At the same time, a plurality of beamforming weighted vectors is arranged in order to generate a beamforming matrix. Preferably, if the dimension of the beamforming weighted vector is equal to the number of transmit antennas, then the beamforming matrix is obtained simply by arranging the plurality of beamforming weighted vectors in a predetermined order. However, if the dimension of the beamforming weighted vector is less than the number of transmit antennas, zero is filled at a specific location of the beamforming weighted vector, and subsequently these extended weighted vectors with the dimension equal to the number of transmit antennas are arranged in a column order so as to generate the beamforming matrix. For example, methods for generating beamforming weighted vectors as disclosed in Chinese Patent Applications CN1653721, CN1689249, CN1864347, and CN1835416. The disclosure of these patent applications is incorporated in its entirety as part of the present specification.

The combination means 333 combines the pre-coding matrix generated by the pre-coding matrix generation means 331 and the beamforming matrix generated by the beamforming matrix generation means 332 to generate a weight matrix and provides the generated weight matrix to the pre-processing means 32 for pre-processing. The operation of the combination means 333 will be described in detail later.

A method for pre-processing data to be transmitted in a multiple-input communication system according to the present invention is described below in conjunction with FIGS. 6 and 7.

Figure 6:
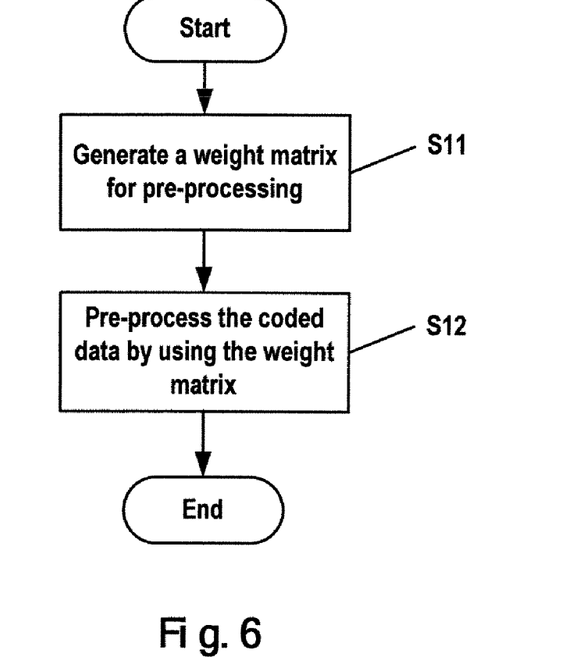
FIG. 6 illustrates a flowchart of a method for pre-processing data to be transmitted in a multiple-input communication system according to the present invention.

FIG. 6 illustrates a flowchart of a method for pre-processing data to be transmitted in a multiple-input communication system according to the present invention. As illustrated in FIG. 6, in step S11, the weight matrix generation means 33 generates a weight matrix for pre-processing. In step S12, the pre-processing means 32 pre-processes coded data by using the weight matrix generated in step S11, to generate pre-processed coded data for transmission over $N_T$ transmit antennas.

Figure 7:
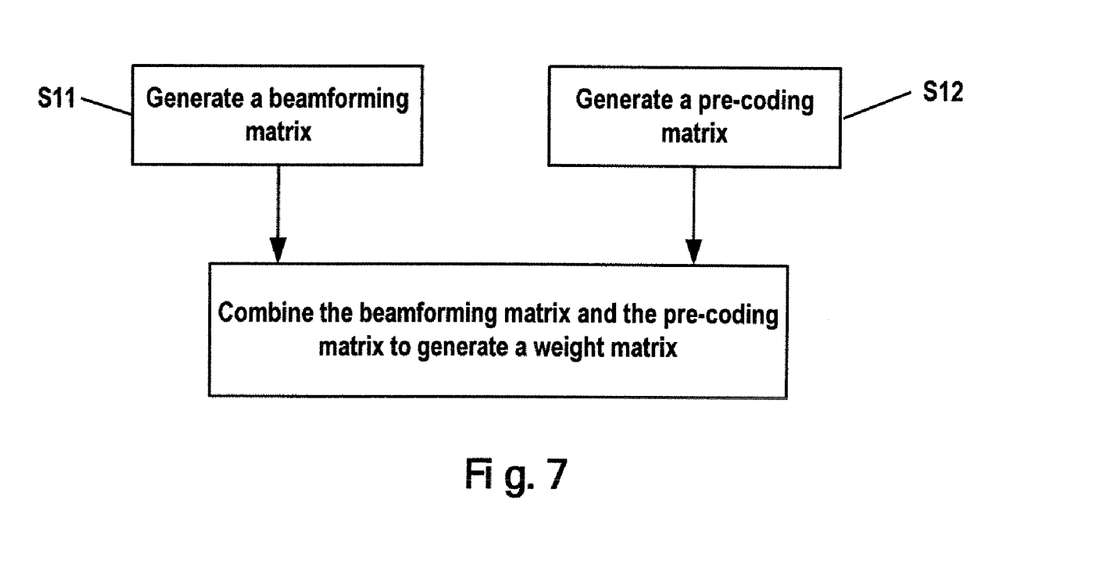
FIG. 7 illustrates detailed steps of generating a weight matrix for pre-processing according to the present invention.

FIG. 7 illustrates detailed steps of generating a weight matrix for pre-processing according to the present invention.

As illustrated in FIG. 7, the beamforming matrix generation means 332 generates a beamforming matrix in step S111.

Preferably, the beamforming matrix generation means 332 generates beamforming weighted vectors according to obtained location information of a target user and/or interference users, and at the same time, the plurality of beamforming weighted vectors are arranged in order to generate a beamforming matrix. If the dimension of the beamforming weighted vector is equal to the number of transmit antennas, the beamforming matrix is generated simply by arranging the plurality of beamforming weighted vectors in a column order. However, if the dimension of the beamforming weighted vector is less than the number of transmit antennas, first zero is filled at a specific location of the beamforming weighted vector, and subsequently these extended weighted vectors with the dimension equal to the number of transmit antennas are arranged in a column order to generate the beamforming matrix.

More preferably, the beamforming matrix is generated according to the estimated direction of arrival of a target user and/or interference users.

In step S112, the pre-coding matrix generation means 331 generates a pre-coding matrix.

Preferably, the pre-coding matrix generation means 331 generates a pre-coding matrix according to a channel matrix fed back from the receiver or a channel matrix obtained according to symmetry of uplink and downlink channels of the communication system. More preferably, a pre-coding matrix can be generated according to an instantaneous channel matrix or long-term channel information.

Specifically, in step S112, if an instantaneous channel matrix is not available, then the pre-coding matrix is calculated based on, for example, long-term channel information or a means matrix or covariance matrix of transmission channels.

In step S112, if an instantaneous channel matrix is obtained with high accuracy, then the pre-coding matrix is calculated based on the instantaneous channel matrix. For example, the pre-coding matrix is generated based on an instantaneous channel matrix accurately fed back from the receiver. In the codebook-based pre-coding scheme, the pre-coding matrix can be generated based on the feedback index of the codeword in a predefined codebook.

In step S112, if the instantaneous channel matrix is available but its accuracy is not so good, then the pre-coding matrix can be generated by integrating the two kinds of channel information, i.e., $P = c \times P_{Long-term} + d \times P_{Instantaneous}$, in which $P_{Long\text{-}term}$ and $P_{Instantaneous}$ are pre-coding matrixes generated based on long-term channel information and an instantaneous channel matrix, respectively, P is a combined pre-coding matrix, and the parameters c and d are both constants that are not less than 0 but not more than 1 and dependent on the accuracy of the instantaneous channel matrix. That is, more accurate the instantaneous channel matrix, the less c and the larger d, and vice versa, less accurate the instantaneous channel matrix, the larger c and the less d.

In step S112, if the long-term channel information is not available, and the instantaneous channel information is not available or its accuracy is very poor, then the pre-coding matrix is selected as an identity matrix or a certain sub-matrix formed by part of column vectors of an identity matrix.

Further, in step S113, the combination means 333 combines the pre-coding matrix generated by the pre-coding matrix generation means 331 and the beamforming matrix generated by the beamforming matrix generation means 332, to generate a weight matrix.

Preferably, the combination means 333 performs a linear combination of the pre-coding matrix generated by the pre-coding matrix generation means 331 and the beamforming matrix generated by the beamforming matrix generation means 332, to generate a weight matrix. That is, $$W = a \times B + b \times P$$

in which B is a beamforming matrix, P is a pre-coding matrix, W is a weight matrix, and a and b are constants with the values being selected according to a measured interference level.

Specifically, if the interference level is very high, a is selected to be close or equal to 1, and b is selected to be close or equal to 0, so that the largest interference suppression gain, i.e., beamforming gain, is achieved. In this case, W is close or equal to B.

If the interference level is very low, a is selected to be close or equal to 0, and b is selected to be close or equal to 1, so that the largest pre-coding gain is achieves. In this case, W is close or equal to P.

If the interference level is medium, values of a and b are selected such that 0<a<1 and 0<b<1. Generally, if more beamforming gain is required than pre-coding gain, then a>b, whereas a<b if more pre-coding gain is required than beamforming gain.

An advantage of the present invention is that sufficient flexibility of combining the beamforming MIMO technique and the pre-coding MIMO technique is provided such that practical communication systems can achieve the best overall performance.

The method and device for pre-processing data to be transmitted in a multiple-input communication system, which have been described above, can be implemented in various forms, for example, implemented in hardware, software or a combination thereof.

For hardware implementation, the present invention can be implemented as an application-specific integrated circuit ASIC, a digital signal processor (DSP), a digital signal processing device (DSPD), a programmable logic device (PLD), a field programmable gate array (FPGA), a processor, a controller, a micro-processor or a micro-controller.

For software implementation, those skilled in the art would appreciate that the present invention may be embodied in a computer program product arranged on a carrier medium to be used for any proper data processing system. Such a signal carrier medium may be a transmission medium or a recordable medium used for machine readable information, including a magnetic medium, optical medium or other proper medium. Examples of a recordable medium include a magnetic disc or floppy in a hard disc drive, an optical disc for an optical drive, a magnetic tape, and other medium those skilled in the art would conceive. Examples of a transmission medium include a telephony network for voice communication and a digital data communication network like the Ethernet and a network in communication with the World Wide Web over the Internet Protocol. Those skilled in the art would appreciate that any communication device with proper programming means can perform steps of the method of the present invention as embodied in a program product for example.

It is to be understood from the foregoing description that modifications and alterations can be made to all embodiments of the present invention without departing from the spirit of the present invention. The description in the present specification is intended to be illustrative and not limiting. The scope of the present invention is limited by the appended claims only.

What is claimed is:

1. A method for pre-processing data to be transmitted in a multiple-input communication system, the method comprising:
   generating a beamforming matrix and a pre-coding matrix;
   combining the beamforming matrix and the pre-coding matrix to generate a weight matrix; and
   pre-processing, by a signal processor, data to be transmitted using the generated weight matrix.

2. The method according to claim 1, wherein a linear combination is performed on the beamforming matrix and the pre-coding matrix to generate the weight matrix according to the following expression:

$$W = a \times B + b \times P$$

in which B is the beamforming matrix, P is the pre-coding matrix, W is the weight matrix, and a and b are constants, wherein the values of a and b are selected according to a measured interference level.

3. The method according to claim 1, wherein beamforming weighted vectors are generated based on estimated location information concerning a target user and/or interference users, and the plurality of beamforming weighted vectors are used to generate the beamforming matrix.

4. The method according to claim 3, wherein
   if the beamforming weighted vectors are equal to the number of transmit antennas, the beamforming weighted vectors are arranged in columns to generate the beamforming matrix; and
   if the beamforming weighted vectors are less than the number of transmit antennas, one or more zero values are stuffed in the beamforming weighted vectors to generate weighted vectors equal to the number of transmit antennas, and the resulting weighted vectors are arranged in columns to generate the beamforming matrix.

5. The method according to claim 3, wherein the location information is the direction of arrival.

6. The method according to claim 1, wherein the pre-coding matrix is generated according to channel information.

7. The method according to claim 6, wherein the pre-coding matrix is generated according to long-term channel information, and wherein the long-term channel information is a selected one of a covariance matrix of channels and a mean matrix of channels.

8. The method according to claim 6, wherein the pre-coding matrix is generated according to an instantaneous channel matrix.

9. The method according to claim 6, wherein the pre-coding matrix is generated according to long-term channel information and an instantaneous channel matrix.

10. The method according to claim 6, wherein, if channel information is not available, the pre-coding matrix is a selected one of an identity matrix and a certain sub-matrix formed by some column vectors of an identity matrix.

11. The method according to claim 2, wherein if the interference level is above a given threshold, a is selected to be substantially equal to 1, and b is selected to substantially equal to 0.

12. The method according to claim 2, wherein if the interference level is lower than a given threshold, a is selected to be substantially equal to 0, and b is selected to be substantially equal to 1.

13. The method according to claim 2, wherein if the interference level is between a first value and a second value, values of a and b are selected such that $0<a<1$ and $0<b<1$.

14. The method according to claim 13, wherein if more beamforming gain than pre-coding gain is desired, values of a and b are selected such that $a>b$.

15. The method according to claim 13, wherein if more pre-coding gain than beamforming gain is desired, values of a and b are selected such that $a<b$.

16. The method according to claim 1, wherein the multiple-input communication system is a multiple-input single-output communication system.

17. The method according to claim 1, wherein the multiple-input communication system is a multiple-input multiple-output communication system.

18. A device for pre-processing data to be transmitted in a multiple-input communication system, the device comprising:
a signal processor configured to pre-process data to be transmitted using a weight matrix, wherein the weight matrix is generated combining a beamforming matrix and pre-coding matrix.

19. The device according to claim 18, further comprising;
a weight processor configured to combine the beamforming matrix and the pre-coding matrix to generate the weight matrix, wherein the weight processor is configured to perform a linear combination on the beamforming matrix and the pre-coding matrix to generate the weight matrix according to the following expression:

$$W=a \times B+b \times P$$

in which B is the beamforming matrix, P is the pre-coding matrix, W is the weight matrix, and a and b are constants, wherein the values of a and b are selected according to a measured interference level.

20. The device according to claim 18, further comprising:
a beamforming processor configured to generate the beamforming matrix, wherein the beamforming processor is configured to generate beamforming weighted vectors based on estimated location information concerning a target user and/or interference users, and the plurality of beamforming weighted vectors are used to generate the beamforming matrix.

21. The device according to claim 20, wherein
if the beamforming weighted vectors are equal to the number of transmit antennas, the beamforming weighted vectors are arranged in columns to generate the beamforming matrix; and
if the beamforming weighted vectors are less than the number of transmit antennas, one or more zero values are stuffed in the beamforming weighted vectors to generate weighted vectors equal to the number of transmit antennas, and the resulting weighted vectors are arranged in columns to generate the beamforming matrix.

22. The device according to claim 20, wherein the location information is the direction of arrival.

23. The device according to claim 18, further comprising:
a pre-coding processor configured to generate the pre-coding matrix, wherein the pre-coding processor configured to generate the pre-coding matrix according to channel information.

24. The device according to claim 23, wherein the pre-coding processor is configured to generate the pre-coding matrix according to long-term channel information, and wherein the long-term channel information is a selected one of a covariance matrix of channels and a mean matrix of channels.

25. The device according to claim 23, wherein the pre-coding processor is configured to generate the pre-coding matrix according to an instantaneous channel matrix.

26. The device according to claim 23, wherein the pre-coding processor is configured to generate the pre-coding matrix according to long-term channel information and an instantaneous channel matrix.

27. The device according to claim 23, wherein if channel information is not available, the pre-coding matrix is a selected one of an identity matrix and a certain sub-matrix formed by some column vectors of an identity matrix.

28. The device according to claim 19, wherein if the interference level is above a given threshold, a is selected to be substantially equal to 1, and b is selected to be substantially equal to 0.

29. The device according to claim 19, wherein if the interference level is lower than a given threshold, a is selected to be substantially equal to 0, and b is selected to be substantially equal to 1.

30. The device according to claim 19, wherein if the interference level is between a first value and a second value, values of a and b are selected such that $0<a<1$ and $0<b<1$.

31. The device according to claim 30, wherein if more beamforming gain than pre-coding gain is desired, values of a and b are selected such that $a>b$.

32. The device according to claim 30, wherein if more pre-coding gain than beamforming gain is desired, values of a and b are selected such that $a<b$.

33. The device according to claim 18, wherein the multiple-input communication system is a multiple-input single-output communication system.

34. The device according to claim 18, wherein the multiple-input communication system is a multiple-input multiple-output communication system.

35. The device according to claim 18 implemented in a transmitter.

36. The device according to claim 35 wherein the transmitter is implemented in a base station.

37. The device according to claim 36 wherein the base station is implemented in a communication system.

38. A method for pre-processing data to be transmitted in a multiple-input communication system, the method comprising:
generating a beamforming matrix and a pre-coding matrix;
combining the beamforming matrix and the pre-coding matrix to generate a weight matrix; and pre-processing data to be transmitted using the generated weight matrix;
wherein beamforming weighted vectors are generated based on estimated location information concerning a target user and/or interference users and the beamforming weighted vectors are used to generate the beamforming matrix.

* * * * *